US010793459B2

(12) United States Patent
Huber

(10) Patent No.: US 10,793,459 B2
(45) Date of Patent: Oct. 6, 2020

(54) EFFECTIVE DISCHARGE OF EXHAUST FROM SUBMERGED COMBUSTION MELTERS AND METHODS

(71) Applicant: JOHNS MANVILLE, Denver, CO (US)

(72) Inventor: Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/274,485

(22) Filed: Feb. 13, 2019

(65) Prior Publication Data

US 2019/0177200 A1 Jun. 13, 2019

Related U.S. Application Data

(62) Division of application No. 15/189,634, filed on Jun. 22, 2016, now Pat. No. 10,246,362.

(51) Int. Cl.
*C03B 5/20* (2006.01)
*B01D 5/00* (2006.01)
(Continued)

(52) U.S. Cl.
CPC .............. *C03B 5/20* (2013.01); *B01D 5/0012* (2013.01); *B01D 5/0057* (2013.01); *B01D 53/00* (2013.01);
(Continued)

(58) Field of Classification Search
CPC .......... C03B 5/04–05; C03B 5/20–207; C03B 5/235–2356
See application file for complete search history.

(56) References Cited

U.S. PATENT DOCUMENTS 1,579,353 A 4/1926 Good
1,636,151 A 7/1927 Schofield
(Continued)

FOREIGN PATENT DOCUMENTS

DE 11 05 116 B 4/1961
DE 36 29 965 A1 3/1988
(Continued)

OTHER PUBLICATIONS

"AccuTru Temperature Measurement," AccuTru International Corporation, 2003.
(Continued)

*Primary Examiner* — Lisa L Herring
(74) *Attorney, Agent, or Firm* — Robert D. Touslee

(57) ABSTRACT

Submerged combustion methods and systems including a melter equipped with an exhaust passage through the ceiling or the sidewall having an aggregate hydraulic diameter. Submerged combustion burners configured to create turbulent conditions in substantially all of the material being melted, and produce ejected portions of melted material. An exhaust structure including a liquid-cooled exhaust structure defining a liquid-cooled exhaust chamber having a cross-sectional area greater than that of the exhaust stack but less than the melter. The exhaust passage and liquid-cooled exhaust structure configured to maintain temperature and pressure of the exhaust, and exhaust velocity through the exhaust passage and the exhaust structure, at values sufficient to prevent the ejected material portions of melted material from being propelled out of the exhaust structure as solidified material, and maintain any molten materials contacting the first interior surface molten so that it flows down the first interior surface into the melter.

14 Claims, 8 Drawing Sheets

(51) Int. Cl.

| | | |
|---|---|---|
| *C03B 5/235* | (2006.01) | |
| *F23J 15/06* | (2006.01) | |
| *F23J 11/00* | (2006.01) | |
| *F23C 3/00* | (2006.01) | |
| *C03B 5/04* | (2006.01) | |
| *B01D 53/00* | (2006.01) | |

(52) U.S. Cl.
CPC .............. *C03B 5/04* (2013.01); *C03B 5/2356* (2013.01); *F23C 3/004* (2013.01); *F23J 11/00* (2013.01); *F23J 15/06* (2013.01); *C03B 2211/22* (2013.01); *F23J 2213/30* (2013.01)

(56) References Cited

U.S. PATENT DOCUMENTS

| | | |
|---|---|---|
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,597,858 A | 5/1952 | Howard |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,499,743 A | 3/1970 | Fanica et al. |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,649,235 A | 3/1972 | Harris |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |

(56) References Cited

U.S. PATENT DOCUMENTS

| | | |
|---|---|---|
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,780,122 A | 10/1988 | Schwenninger et al. |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,318,126 B1 | 11/2001 | Takei et al. |
| 6,332,339 B1 | 12/2001 | Kawaguchi et al. |
| 6,338,337 B1 | 1/2002 | Panz et al. |
| 6,339,610 B1 | 1/2002 | Royer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,398,547 B1 | 6/2002 | Joshi et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,470,710 B1 | 10/2002 | Takei et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |

(56) References Cited

U.S. PATENT DOCUMENTS

| | | |
|---|---|---|
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Tagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0016922 A1 | 1/2011 | Kitamura et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090421 A1 | 4/2014 | Shock et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |
| 2014/0318187 A1 | 10/2014 | Semenovich et al. |
| 2015/0307382 A1* | 10/2015 | Wang ............... C03B 3/005 65/335 |
| 2017/0057855 A1* | 3/2017 | Swiler ............... C03B 5/237 |

(56) References Cited

U.S. PATENT DOCUMENTS

FOREIGN PATENT DOCUMENTS

| | | |
|---|---|---|
| DE | 40 00 358 C2 | 3/1993 |
| DE | 44 24 814 A1 | 1/1996 |
| DE | 196 19 919 A1 | 8/1997 |
| DE | 100 29 983 A1 | 1/2002 |
| DE | 100 29 983 C2 | 9/2003 |
| DE | 10 2005 033330 B3 | 8/2006 |
| EP | 0 181 248 B1 | 10/1989 |
| EP | 1 337 789 B1 | 12/2004 |
| EP | 1 990 321 A1 | 11/2008 |
| EP | 2 133 315 A1 | 12/2009 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 547 A2 | 4/2013 |
| EP | 2 578 548 A2 | 4/2013 |
| EP | 3 138 820 A1 | 3/2017 |
| EP | 3 162 771 A1 | 5/2017 |
| FR | 2 740 860 A1 | 9/1997 |
| GB | 191301772 | 1/1914 |
| GB | 191407633 | 3/1914 |
| GB | 164073 A | 5/1921 |
| GB | 250 536 A | 7/1926 |
| GB | 959 895 A | 6/1964 |
| GB | 1449439 | 9/1976 |
| GB | 1 514 317 A | 6/1978 |
| GB | 2 424 644 A | 10/2006 |
| IT | 1208172 | 7/1989 |
| JP | S58 199728 A | 11/1983 |
| JP | H08 290918 A | 11/1996 |
| KR | 2000 0050572 A | 8/2000 |
| KR | 100465272 B1 | 12/2004 |
| RO | 114827 | 7/1999 |
| WO | 198707591 A1 | 12/1987 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | 2012125665 A1 | 9/2012 |
| WO | 2013 162986 A1 | 10/2013 |
| WO | 2013 188082 A1 | 12/2013 |
| WO | 2013188167 A1 | 12/2013 |

OTHER PUBLICATIONS

"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Huijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
"Gamma Irradiators for Radiation Processing" Booklet, International Atomic Energy Agency, Vienna, Austria.
Furman, BJ, ME 120 Experimental Methods Vibration Measurement, San Jose University Department of Mechanical and Aerospace Engineering.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company, pp. 1-296, Sep. 1, 1995.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Gerber, J., "Les Densimetres Industriels," Petrole et Techniques, Association Francaise des Techniciens du Petrole, Jun. 1, 1989, pp. 26-27, No. 349, Paris, France.
Rue et al, "Submerged Combustion Melting of Glass," International Journal of Applied Glass Science, Nov. 9, 2011, pp. 262-274, vol. 2, No. 4.
National Laboratory, US DOE Contract No. DE-AC09-08SR22470, Oct. 2011.

* cited by examiner

900 ⟶

902 ⟶
A submerged combustion manufacturing method comprising melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising one or more exhaust passages through the ceiling 904 ⟶
Combusting a fuel in the one or more SC burners, the SC burners discharging combustion products under a level of the material being melted in the melter and creating turbulent conditions in substantially all of the material as well as ejected portions of melted material 906 ⟶
Exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter

A submerged combustion manufacturing method comprising melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising and one or more exhaust passages through the wall structure

1004

Combusting a fuel in the one or more SC burners, the SC burners discharging combustion products under a level of the material being melted in the melter and creating turbulent conditions in substantially all of the material as well as ejected portions of melted material

1006

Exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter

FIG. 10

EFFECTIVE DISCHARGE OF EXHAUST FROM SUBMERGED COMBUSTION MELTERS AND METHODS

CROSS REFERENCE TO RELATED APPLICATION

This application is a division of U.S. application Ser. No. 15/189,634 filed Jun. 22, 2016, now U.S. Pat. No. 10,246,362, issued Apr. 2, 2019, the entire disclosure of which is hereby incorporated by reference herein.

BACKGROUND INFORMATION

Technical Field

The present disclosure relates generally to the field of submerged combustion melters and apparatus, and methods of use, and more specifically to submerged combustion melters, and methods of operating same, particularly for melting glass-forming materials, mineral wool and stone wool forming materials, and other non-metallic inorganic materials.

Background Art

A submerged combustion melter (SCM) may be employed to melt glass batch and/or waste glass materials to produce molten glass, or may melt mineral wool feedstock (basalt rock, sometimes referred to as lava rock) to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming. Conventional melters operate primarily by combusting fuel and oxidant above the molten pool of melt, and are very laminar in flow characteristics compared to SCMs.

In known SCMs, exhaust exits through one or more exhaust ports in the ceiling and/or sidewalls, then is mixed with dissolution air to cool the exhaust gases and convey them to an abatement system such as a baghouse. Improvements were made to this system as described in Applicant's previous U.S. Pat. No. 8,707,740 including in some embodiments the provision of a liquid-cooled transition section connecting the exhaust passage with an air-cooled exhaust section, which then connects to the exhaust stack.

However, additional issues have been identified and innovations made to further improve exhaust gas discharge from a submerged combustion melter. A particular problem has been discovered that as SC burners operate, large balloons or envelopes (note—suggest using "balloons" or "envelopes" rather than "bubbles" as there may be confusion of this with foam bubbles) containing combustion products "pop" after they rise, causing pressure pulses in the SCM and ejected molten masses ("blobs") traveling upwards. The pressure pulses vary the pressure and exhaust flow rate and can enhance particulate feed carryover ("carryover" is a term of art, meaning some of the particulate feed is entrained into the exhaust without being melted). In addition, despite the provision of the liquid-cooled transition section as described in the '740 patent, it has been discovered through testing that some of the ejected molten masses can still actually exit the melter and solidify as small solid particles (shot), and in severe cases may cause blockage of SCM exhaust ports and/or negatively affect product homogeneity.

It would be advantageous to take advantage of the aggressive mixing and turbulence in the SCM while minimizing these disadvantages in order to improve the quality (mainly determined by product homogeneity in composition and temperature) and the quantity of melt from an SCM.

SUMMARY

In accordance with the present disclosure, innovations have been made to further improve exhaust gas discharge from a submerged combustion melter, maximize mixing of particulate feed materials into molten mass within a SCM while minimizing or eliminating carryover of particulate feed materials in SCM exhaust, and minimize or eliminate solidified shot particles from exiting the melter through the exhaust structure. "Particulate feed materials" may include glass batch or other particulate matter (organic or inorganic), fed separately or in combination (mixed, semi-mixed, or agglomerated). SCMs and methods wherein the height of a liquid-cooled exhaust discharge stack above a splash region or splash zone within the SCM is increased are described, some SCM embodiments and methods including strategic placement and sizing of the SCM exhaust gas discharge opening(s), and designs to promote draining of molten material back into the molten mass, while producing molten glass and other non-metallic inorganic materials, such as rock wool and mineral wool.

One aspect of this disclosure is a submerged combustion manufacturing method comprising:

melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising an exhaust passage through the roof, through the sidewall structure, or both;

combusting a fuel in the one or more SC burners, the SC burners discharging combustion products under a level of the material being melted in the melter and creating turbulent conditions in substantially all of the material as well as ejected portions of melted material; and exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter. It is expressly understood that embodiments including only a liquid-cooled exhaust structure fluidly connecting the SCM exhaust passage or passages with the conventional exhaust stack are described herein. (By "conventional exhaust stack" is meant the ducting routing exhaust to a baghouse or other environmental compliance units, such as an electrostatic precipitator or cyclone separator).

Certain embodiments may comprise, or consist essentially of, the steps of the first aspect, and in addition may include exhausting the exhaust material from the liquid-cooled exhaust structure to a gas-cooled exhaust structure fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining. Certain embodiments may comprise, or consist essentially of, or consist of the steps of the first aspect, and in addition include wherein the exhaust passage is substantially centrally located between a feed end and an exit end of the melter, and the exhausting of the exhaust material through the exhaust structure comprises exhausting the exhaust material substantially centrally between the feed end and the exit end of the melter.

Another aspect of the disclosure is submerged combustion manufacturing systems for carrying out such methods. Other method and system embodiments, such as detailed herein, are considered aspects of this disclosure. Methods and systems of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 9 and 10 are logic diagrams illustrating two methods of the present disclosure.

Figure 1:
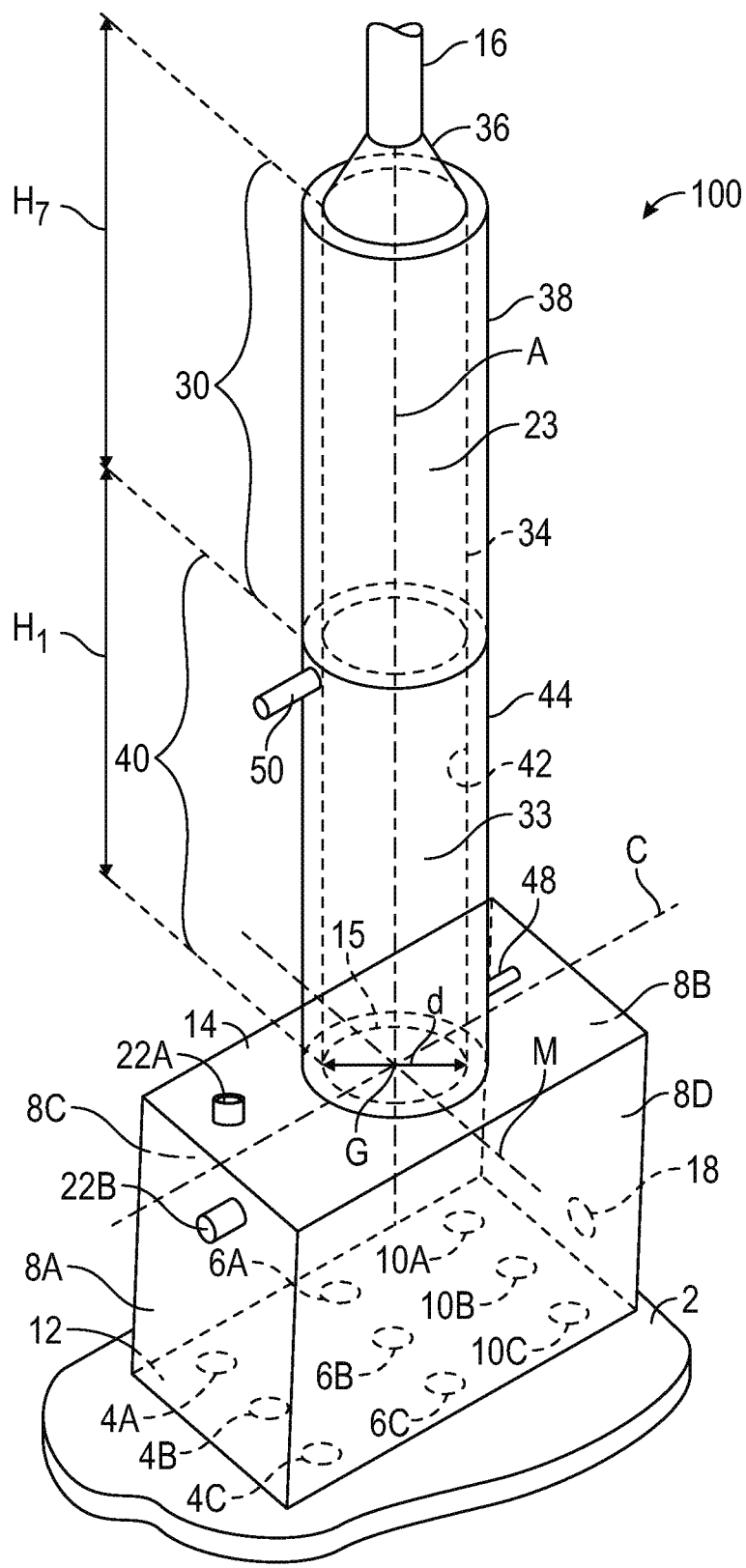
FIG. 1 is a schematic perspective view, partially in phantom, of a first embodiment of a submerged combustion manufacturing system in accordance with the present disclosure.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are also explicitly disclosed herein and are part of this disclosure. An example of "consisting essentially of" may be with respect to the total feed to an SCM: a feed consisting essentially of particulate feedstock means there may be a minor portion of feed that is not particulate feedstock, such as rock used to make rock wool. An example of "consisting of" may be a feedstock made up of only particulate feedstock, or only inorganic particulate feedstock. Another example of "consisting essentially of" may be with respect to particulate feedstock that consists essentially of inorganic feedstock, meaning that a minor portion, perhaps up to 10, or up to 5, or up to 4, or up to 3, or up to 2, or up to 1 wt. percent may be organic. Example of methods and systems using the transition phrase "consisting of" include those where only a liquid-cooled exhaust system is used, with no gas-cooled exhaust structure, or vice versa. Another example of methods and systems where "consisting of" is used may be with respect to absence of refractory linings in either the liquid-cooled exhaust structure, the gas-cooled exhaust structure, or both. Another example of methods and systems where "consisting of" is used may be with respect to the exhaust structure consisting of a liquid-cooled exhaust structure, and complete absence of a gas-cooled exhaust structure. The term "comprising" and derivatives thereof is not intended to exclude the presence of any additional component, step or procedure, whether or not the same is disclosed herein. In order to avoid any doubt, all compositions, systems, and methods claimed herein through use of the term "comprising" may include any additional component, step, or procedure unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percentages are based on weight and all test methods are current as of the filing date hereof. The acronym "ASTM" means ASTM International, 100 Barr Harbor Drive, PO Box C700, West Conshohocken, Pa., 19428-2959 USA.

All numbers disclosed herein are approximate values, regardless whether the word "about" or "approximate" is used in connection therewith. They may vary by 1%, 2%, 5%, and sometimes, 10 to 20%. Whenever a numerical range with a lower limit, RL and an upper limit, RU, is disclosed, any number falling within the range is specifically disclosed. In particular, the following numbers within the range are specifically disclosed: $R=RL+k^*(RU-RL)$, wherein k is a variable ranging from 1% to 100% with a 1% increment, i.e., k is 1%, 2%, 3%, 4%, 5%, . . . , 50%, 51%, 52%, . . . , 95%, 96%, 97%, 98%, 99%, or 100%. Moreover, any numerical range defined by two R numbers as defined in the above is also specifically disclosed.

All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, additional issues have been identified and innovations made to further improve exhaust gas discharge from a submerged combustion melter. A particular problem has been discovered that as SC burners operate, large balloons or envelopes containing combustion products "pop" after they rise, causing pressure pulses in the SCM and ejected molten masses traveling upwards. The pressure pulses vary the pressure and exhaust flow rate and can enhance particulate feed carryover. In addition, despite the provision of the liquid-cooled transition section as described in the '740 patent, it has been discovered through testing that some of the ejected molten masses can still actually exit the melter and solidify as small solid particles (shot), and in severe cases may cause blockage of SCM exhaust ports and/or negatively affect product homogeneity.

Various modifications to previously known SCMs and methods of operating same have been discovered that achieve the desired goal of increased residence time of the material being melted in the SCM, which is critical to achieving good quality product, while reducing ejection of solidified materials out of the exhaust structure. In particular, the SCMs and methods described herein take advantage of the aggressive mixing and turbulence in the SCM while minimizing the disadvantages associated with splashing in order to improve the quality (mainly determined by product homogeneity in composition and temperature) and the quantity of melt from an SCM.

The present disclosure is devoted to improvements to SCM exhaust structures, in particular extending the liquid-cooled portion from a mere transition to a major portion of the exhaust structure, or indeed the entire exhaust structure in some embodiments, except for the ducting leading to the environmental compliance equipment as mentioned herein. Other improvements relate to the position of the exhaust passages in the SCM ceiling or sidewall structure, or both. In previous designs, as described in the '740 patent, we cooled the first 1 ft. section with water then the next 6 ft. with air due to weight issues with the water cooling and existing steel work. In accordance with the present disclosure, the preferred "next generation" design is to just liquid-cool about 8 to about 12 ft. in height before transitioning to the hood for air inspiration and metal stack leading to the environmental compliance equipment. All individual values and subranges from about 8 up to about 12 ft. are included herein and disclosed herein; for example, the liquid-cooled exhaust section height may range from a lower limit of 6.0, 6.5, 7.5, 7.8, 8, 8.5, 9, 10, or 11 ft. to an upper limit of 9, 9.5, 9.7, 10.5, 10.8, 11, 11.2, 11.5, 11.7, 12, 12.3, 12.5, 13, or 14 ft. For example, from about 7.5 to about 11.5 ft., or from about 9 to about 11 ft., or from about 9.5 to about 10.5 ft. In embodiments where there is no burner directly under the exhaust passage, a shorter length liquid-cooled exhaust section may be employed, for example from about 6 to about 10 ft., or from about 7.5 to about 9.5 ft., or from about 8 to about 9 ft. The shorter liquid-cooled height will be sufficient for higher viscosity molten materials, but for lower viscosity molten compositions (for example certain molten glass compositions) perhaps a higher liquid-cooled section may be employed, especially if the SC burners are being aggressively fired.

The larger the throughput of the SCM the larger the exhaust passage cross-section to maintain the exhaust gas velocity below the 25 ft./min. threshold. Depending on the size of the SCM the exhaust passage and liquid-cooled exhaust section would be sized based on the exhaust gas velocity, assuming the exhaust is all gas and disregarding molten and solid bodies that may be in the actual exhaust. The exhaust gas velocity is calculated by dividing the volumetric flow rate of the exhaust by the cross-sectional area of the exhaust passage. The volumetric flow rate of the exhaust gas may be estimated via simulation before the SCM and system are constructed, based on the throughput of material being melted, firing rate of burners, heating value and flow rate of fuel, and other parameters familiar to engineers working in the SCM art. After construction of the system, volumetric flow rate may be measured by one or more flow meters placed in the liquid-cooled exhaust section. All individual values and subranges of exhaust velocity through exhaust passages from about 25 ft./min. down to about 2.5 ft./min are included herein and disclosed herein; for example, the exhaust velocity may range from a upper limit of 27, 26, 25.5, 25, 25.7, 24.8, 24, 23.5, 22.9, 20, or 15 ft. to lower limit of 1, 1.5, 2.5, 3, 3.5, 4.0, 4.5, 5.2, 5.5, 6.7, 12, 12.3, 12.5, 15, or 21 ft./min. For example, from about 6.7 to about 27 ft./min., or from about 9 to about 23 ft./min., or from about 9.5 to about 15 ft./min.

Whether an SCM is small or large (throughput), it was surprising that the height of the liquid-cooled exhaust section should be fairly constant as it is the height the SC burners "spit" glass blobs (or other material being melted) upward that is critical. For example, an SCM firing 2 SC burners with an SCM throughput of 150 lb/hr., an SCM firing 6 SC burners with an SCM throughput of 20 tons/day, and a "production-size" SCM firing 8 SC burners in a 45 ton/day unit, the height of the liquid-cooled exhaust section was similar, only the cross-sectional area of the exhaust passages changed (increased).

Various terms are used throughout this disclosure. The terms "roof" and "ceiling" are used interchangeably. The terms "process" and "method" are considered interchangeable. "Submerged" as used herein when referencing the SC burners means that combustion gases emanate from combustion burners or combustion burner panels under the level of the molten glass in a turbulent molten melt region as defined herein; the burners or burner panels may be floor-mounted, wall-mounted, roof-mounted, or in melter embodiments comprising more than one submerged combustion burner, any combination thereof (for example, two floor mounted burner panels and one wall mounted burner panel). Burner panels (such as described in Applicant's U.S. patent application Ser. No. 14/838,148, filed Aug. 27, 2015) may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner panel emits only oxidant, and vice versa). "SC" as used herein means "submerged combustion" unless otherwise specifically noted, and "SCM" means submerged combustion melter unless otherwise specifically noted. The term "submerged" when referencing particulate feed material inlet ports or distal ends of feed conduits has similar meaning, except that they are submerged in the splash region rather than the turbulent molten melt region.

The term "hydraulic diameter" means $D_H=4A/P$, where A is the cross-sectional area, and P is the wetted perimeter of the cross-section. Hydraulic diameter is mainly used for calculations involving turbulent flow, and for calculating Reynolds number, $Re=\rho uL/\mu$, where $L=D_H$, $\mu$=viscosity, $\rho$=density, and u=velocity. Secondary flows (for example, eddies) can be observed in non-circular conduits as a result of turbulent shear stress in the fluid flowing through the conduit experiencing turbulent flow. Hydraulic diameter is also used in calculation of heat transfer in internal flow problems. For a circle conduit. $D_H$ equals the diameter of the circle. For a square conduit having a side length of a, the $D_H$ equals a. For a fully filled conduit whose cross section is a regular polygon, the hydraulic diameter is equivalent to the diameter of a circle inscribed within the wetted perimeter. "Turbulent conditions" means having a Re>4000, or greater than 5000, or greater than 10,000, or greater than 20,000 or higher. The phrase "turbulent conditions in substantially all of the material being melted" means that the SC burners and the SCM are configured so that there are some regions near the wall and floor of the SCM where the material being melted will be in transient or laminar flow as measured by Re, but the majority (perhaps greater than 51%, or greater than 55%, or greater than 6%, or greater than 65%, or greater than 70%, or greater than 75%, or greater than 80% of the material being melted will be experiencing turbulent flow. Transient flow is defined as 2300<Re<4000, and laminar flow is defined as Re<2300. The phrase "ejected portions of melted material" means portions of the material being melted (or completely molten material) that actually separate from the splash zone and travel generally upward toward the SCM ceiling, or toward the SCM walls above the splash zone, and even up into the exhaust structure, then either solidify or drip back down into the melt, or fall back into the melt after an arcuate path upward, reaching a maximum, then falling back into the melt, as in projectile motion.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "melter exhaust", and "melter flue gas" are equivalent terms and refer to a combination of combustion gases and effluent from the feedstock being melted, such as adsorbed water, water of hydration, $CO_2$ liberated from $CaCO_3$, and the like. Therefore exhaust may comprise oxygen or other oxidants, nitrogen, combustion products (including but not limited to, carbon dioxide, carbon monoxide, $NO_x$, $SO_x$, $H_2S$, and water), uncombusted fuel, reaction products of melt-forming ingredients (for example, but not limited to, basalt, sand (primarily $SiO_2$), clay, limestone (primarily $CaCO_3$), burnt dolomitic lime, borax and boric acid, and the like.

As used herein, unless indicated to the contrary, "feedstock" includes, but is not limited to: glass batch; cullet; and pieces of porous, semi-porous, or solid rock or other non-metallic inorganic material, or organic material, or mixture of organic and inorganic material. "Particulate feedstock" as used herein means any feedstock having a weight average particle size (APS) that is small, where small is less than 1 mm APS. Other size feedstock(s) may simultaneously be fed to the SCMs of this disclosure, for example feedstocks having particle size ranging from about 1 mm to about 10 cm, or from about 1 cm to about 10 cm, or from about 2 to about 5 cm, or from about 1 to about 2 cm. The only upper limit on feedstock weight average particle size for these larger APS feedstocks is the internal diameter of feedstock supply structure components, such as described in Applicant's U.S. Pat. No. 9,643,869, while the lower size limit is determined by angle of flow, flow rate of feedstock, and in those embodiments where heat is exchanged directly or indirectly from melter exhaust to the feedstock, flow rate of melter exhaust.

"Oxidant" as used herein includes air, gases having the same molar concentration of oxygen as air (for example "synthetic air"), oxygen-enriched air (air having oxygen concentration greater than 21 mole percent), and "pure" oxygen grades, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

"INCONEL®" as used herein means one or more of a family of austenitic nickel-chromium super alloys known under the trade designation INCONEL®, available from Special Metals Corporation, New Hartford, N.Y., U.S.A. The composition and some physical properties of austenitic nickel-chromium super alloy known under the trade designation INCONEL® alloy 600 are summarized in Tables 1 and 2 (from Publication Number SMC-027 Copyright©Special Metals Corporation, 2008 (September 8)).

TABLE 1

Chemical Composition, wt. %, of INCONEL ® Alloy 400

| | |
|---|---|
| Nickel (plus Cobalt) | 72.0 min. |
| Chromium | 14.0-17.0 |
| Carbon | 0.15 max. |
| Manganese | 1.0 max. |
| Iron | 6.00-10.00 max. |
| Sulfur | 0.015 max. |

TABLE 1-continued

Chemical Composition, wt. %,
of INCONEL ® Alloy 400

| Silicon | 0.50 max. |
|---|---|
| Copper | 0.50 max. |

TABLE 2

Physical Constants of
INCONEL ® Alloy 600

| Density, g/cm$^3$ | 8.47 |
|---|---|
| lb/in.$^3$ | 0.306 |
| Melting range, ° F. | 2470-2575 |
| ° C. | 1354-1413 |
| Modulus of Elasticity, 10$^3$ ksi (200° F.) | |
| Young Modulus | 30.5 |
| Shear modulus | 11.56 |
| Poisson's Ratio | 0.319 |
| Curie Temperature, ° F. | −192 |
| ° C. | −124 |

Certain submerged combustion manufacturing systems may comprise a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, and one or more exhaust passages through the ceiling or through the sidewall, or both, the exhaust passages having an aggregate hydraulic diameter; the one or more submerged combustion burners configured to discharge combustion products under a level of material being melted in the melter and create turbulent conditions in substantially all of the material being melted as well as ejected portions of melted material; and an exhaust structure fluidly connecting the exhaust passage with an exhaust stack, the exhaust structure comprising (or consisting essentially of, or consisting of): a liquid-cooled exhaust structure fluidly connected to the exhaust passage, the liquid-cooled exhaust structure defining a liquid-cooled exhaust chamber having a first interior surface, the fluid-cooled exhaust chamber having a cross-sectional area greater than that of the exhaust stack but less than the melter, the exhaust passage and liquid-cooled exhaust structure configured to maintain temperature and pressure of the exhaust, and exhaust velocity through the exhaust passage and the exhaust structure, at values sufficient to prevent the ejected material portions of melted material from being propelled out of the exhaust structure as solidified material, and maintain any molten materials contacting the first interior surface molten so that it flows back down the first interior surface back into the melter.

Certain systems may comprise a gas-cooled exhaust structure fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining. Certain systems may comprise the gas-cooled exhaust chamber having a cross-sectional area substantially equal to the cross-sectional area of the liquid-cooled exhaust chamber. Certain systems may comprise a feed inlet in a feed end of the wall structure, a molten product outlet in an exit end of the wall structure, wherein the exhaust passage through the ceiling is positioned substantially centrally between the feed and exit ends. Certain systems may comprise the exhaust passage and the liquid-cooled exhaust chamber having a cross-sectional area configured to produce exhaust velocity of 25 ft./min. or less through the exhaust passage and liquid-cooled exhaust chamber. Certain systems may comprise the submerged combustion burners configured to discharge combustion products primarily non-laterally under the level of material being melted in the melter. Certain systems may comprise the submerged combustion burners are configured to discharge combustion products primarily vertically under the level of material being melted in the melter. Certain systems may comprise the wall structure comprising a feed end wall, an exit end wall, and two sidewalls, with each sidewall connected to both the feed end wall and the exit end wall. Certain systems may comprise the liquid-cooled exhaust structure constructed of metal having service temperature higher than temperature of the exhaust materials. Certain systems may comprise the gas-cooled exhaust structure constructed of metal having service temperature higher than temperature of the exhaust materials. Certain systems may comprise the metal layer being one or more austenitic nickel-chromium super alloys, and the air-cooled surfaces are steel. Certain systems may comprise the liquid-cooled exhaust structure is configured for cooling using a liquid selected from the group consisting of water, organic liquids, inorganic liquids, and combinations thereof. Certain systems may comprise an air inspirator fluidly connecting the liquid-cooled exhaust barrier and the exhaust stack. Certain systems may comprise the air inspirator selected from the group consisting of one or more adjustable panels, and one or more adjustable hoods. Certain systems may comprise the exhaust structure having a cross-sectional shape selected from the group consisting of rectangular, round, oval, trapezoidal, triangular, U-shaped, quadrangular, hexagonal, octagonal, and parabolic.

Certain submerged combustion manufacturing methods may comprise melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising an exhaust passage through the ceiling, or the sidewall structure, or both; combusting a fuel in the one or more SC burners, the SC burners discharging combustion products under a level of the material being melted in the melter and creating turbulent conditions in substantially all of the material as well as ejected portions of melted material; and exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter.

Certain methods may comprise exhausting the exhaust material from the liquid-cooled exhaust structure to a gas-cooled exhaust structure fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining. Certain methods may comprise wherein the melting, combusting, and exhausting are performed, and the exhaust passage and the liquid-cooled exhaust chamber configured to produce exhaust velocity of 25 ft./min. or less through the exhaust passage and liquid-cooled exhaust chamber. Certain methods may comprise wherein the exhaust passage is substantially centrally located between a feed end and an exit end of the melter, and the exhausting of the exhaust material through the exhaust structure comprises exhausting the exhaust material substantially centrally between the feed end and the exit end of the melter. Certain methods may comprise inspiring air into the exhaust material through an air inspirator fluidly connecting the liquid-cooled exhaust structure and the exhaust stack. Certain methods may comprise adjusting the air inspirator to allow more or less air to enter the exhaust stack. Certain methods may comprise feeding small (less than 1 mm APS) particle size batch material to the SCM into at least one feed inlet port. Certain methods may comprise feeding large particle size feedstock (at least 10 cm APS) into the SCM through one or more auxiliary inlet ports.

Figure 6:
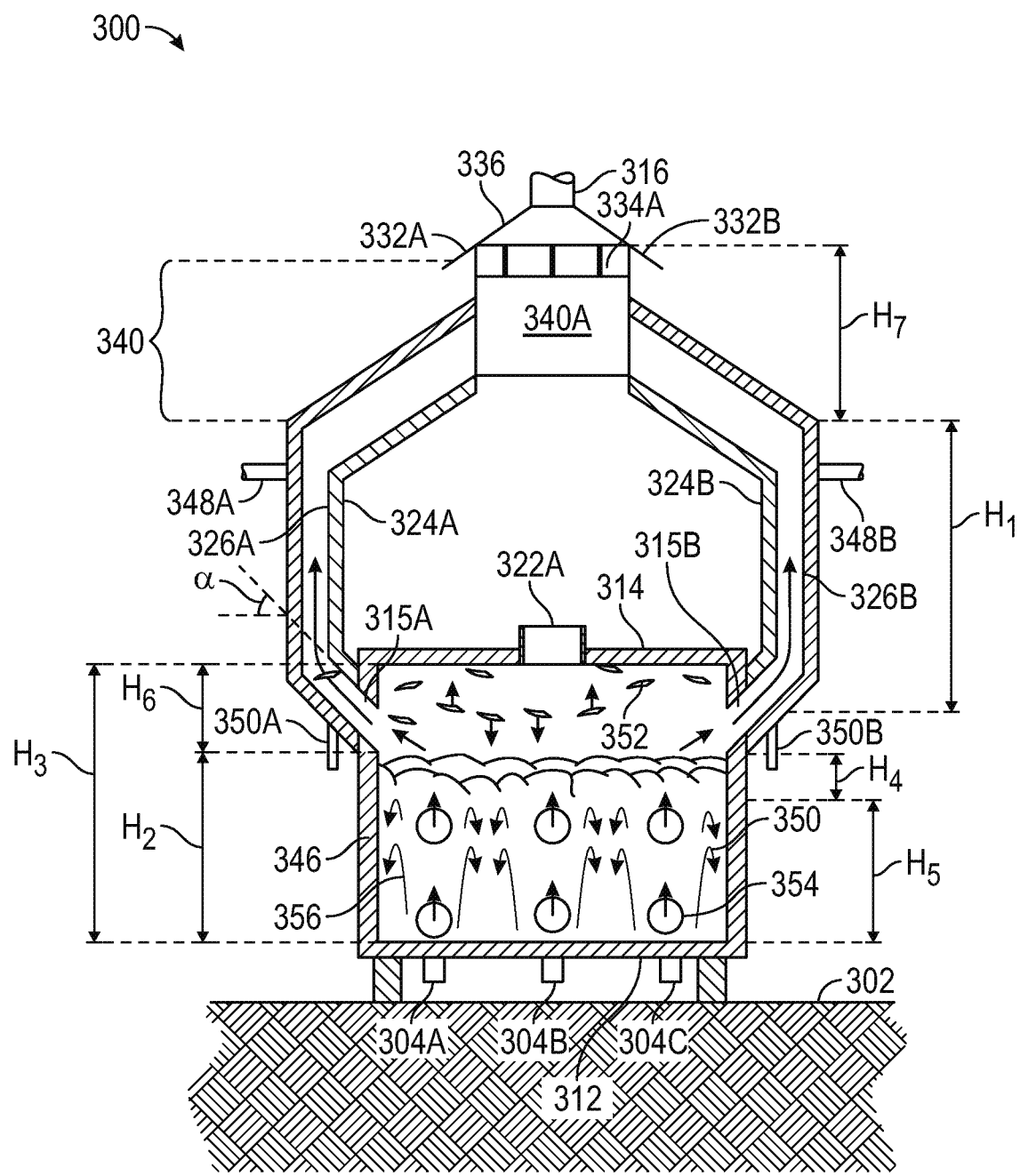
FIG. 6 is a schematic end elevation view, partially in cross-section, of a third embodiment of a submerged combustion manufacturing system in accordance with the present disclosure.
Figure 7:
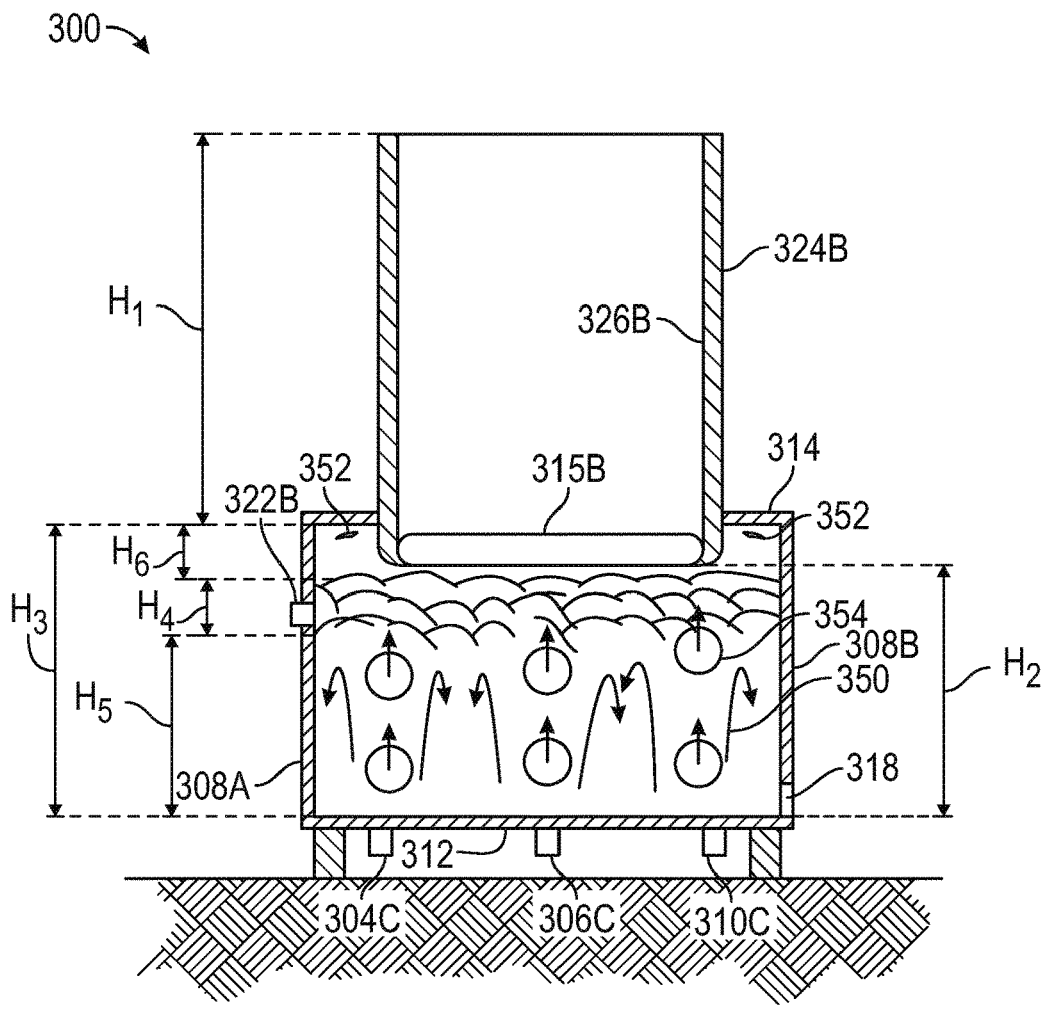
FIG. 7 is a more detailed schematic side elevation view, partially in cross-section, of the system illustrated schematically in FIG. 6.

Referring now to the drawing figures, FIG. 1 is a schematic perspective view, partially in phantom, of a first embodiment 100 of a submerged combustion manufacturing system in accordance with the present disclosure. Embodiment 100 includes nine ports for SC burners 4A, 4B, 4C, 6A, 6B, 6C, 10A, 10B, and 10C arranged in a 3×3 matrix of rows and columns, as illustrated schematically in the plan view of one melter floor plan in FIG. 8. The SCM includes a sidewall structure including a feed end wall 8A, a product exit end wall 8B, a north sidewall 8C, and a south sidewall 8D, SCM floor 12 supported by a support 2, and a roof or ceiling 14. Embodiment 100 includes a circular exhaust passage 15 of diameter d through ceiling 14 fluidly connected to a liquid-cooled exhaust structure 40 having a height H1, which may in turn be fluidly connected to a gas-cooled exhaust structure 30 having a height H7. In certain embodiments gas-cooled exhaust structure is deleted, where H7=0. Gas-cooled exhaust structure 30 is fluidly connected to a metal transition piece 36, which in turn connects to a conventional metal exhaust stack 16 that leads exhaust gases to a baghouse or other environmental compliance unit or units. The liquid-cooled exhaust section 40 may comprise an internal panel 42 and an external panel 44, with any of a variety of liquid channels formed there between for flow of a cooling liquid, such as water or other heat transfer liquid, which may enter through a conduit 48 and exit through another conduit 50. The internal surface of internal panel 42 defines a liquid-cooled exhaust chamber 33. Similarly, gas-cooled exhaust structure, if present, would be formed from an internal metal panel 34 made of a metal such as one of the austenitic nickel-chromium super alloys known under the trade designation INCONEL®, with steel gas-cooling features 38, such as fins or compartments for flowing a gas such as air or other gas therethrough, such as nitrogen, a halogenated gas such as tri-chloroethane, and the like. Internal metal panel 34 defines a gas-cooled exhaust chamber 23. A dashed vertical line schematically illustrates a longitudinal axis A of the exhaust structure. A centerline of the SCM is designated by dashed line C, and a midpoint line is designated as M. G designates a geographic center point of the melter, the intersection of imaginary lines C and M. Features C and M are also schematically illustrated in FIG. 8. A particulate feedstock inlet 22A is indicated in ceiling 14, and an alternate feedstock location is indicated at 22B in feed end wall 8C, 22B preferably located in a splash region of the SCM, as more fully discussed in relation to embodiment 300 (FIGS. 6 and 7). Particulate feedstock inlet 22A or 22B (there may be more than one) is/are fed by a particulate feeder (not illustrated), which may include an auger or screw feeder (not illustrated), as well as a device to maintain the feedstock inlet open, such as a pipe-in-pipe knife arranged inside feeder tube 22B operated by an actuator with a timer for example (the knife, actuator, and timer are not illustrated for clarity). Other feed inlets, not illustrated but for example for scrap, as described in Applicant's U.S. Pat. No. 8,650,914 may be present in feed end wall 8C in certain embodiments. While not important to the various SCM and method embodiments described herein, the SCM is typically fluidly connected to (but not necessarily structurally connected to) a melter exit structure through a product exit spout 18.

Figure 8:
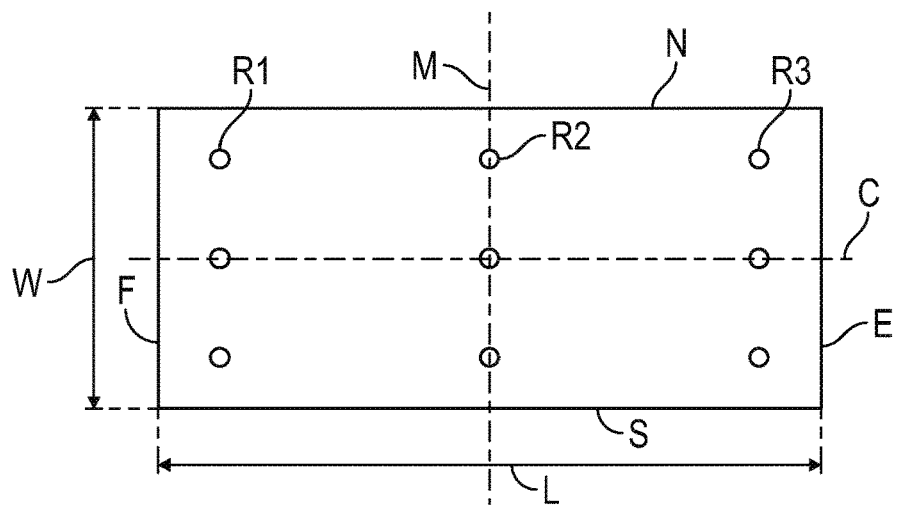
FIG. 8 is a schematic plan view of one melter floor plan in accordance with the present disclosure.

Important to certain methods of the present disclosure are the definitions exemplified schematically in FIG. 8: R1, R2, and R3 designate the first row, second row, and third row of SC burners, where the first row R1 is closest to the feed end of the SCM, and the third row R3 is closest to the melt exit end. There may be more or less than three rows of SC burners. Further defined in FIG. 8 are the length (L) of the SCM, the width (W), the midpoint (M), the centerline (C), and the north (N) and south (S) sides of the SCM, the SCM having a feed end (F) and exit end (E).

Figure 2:
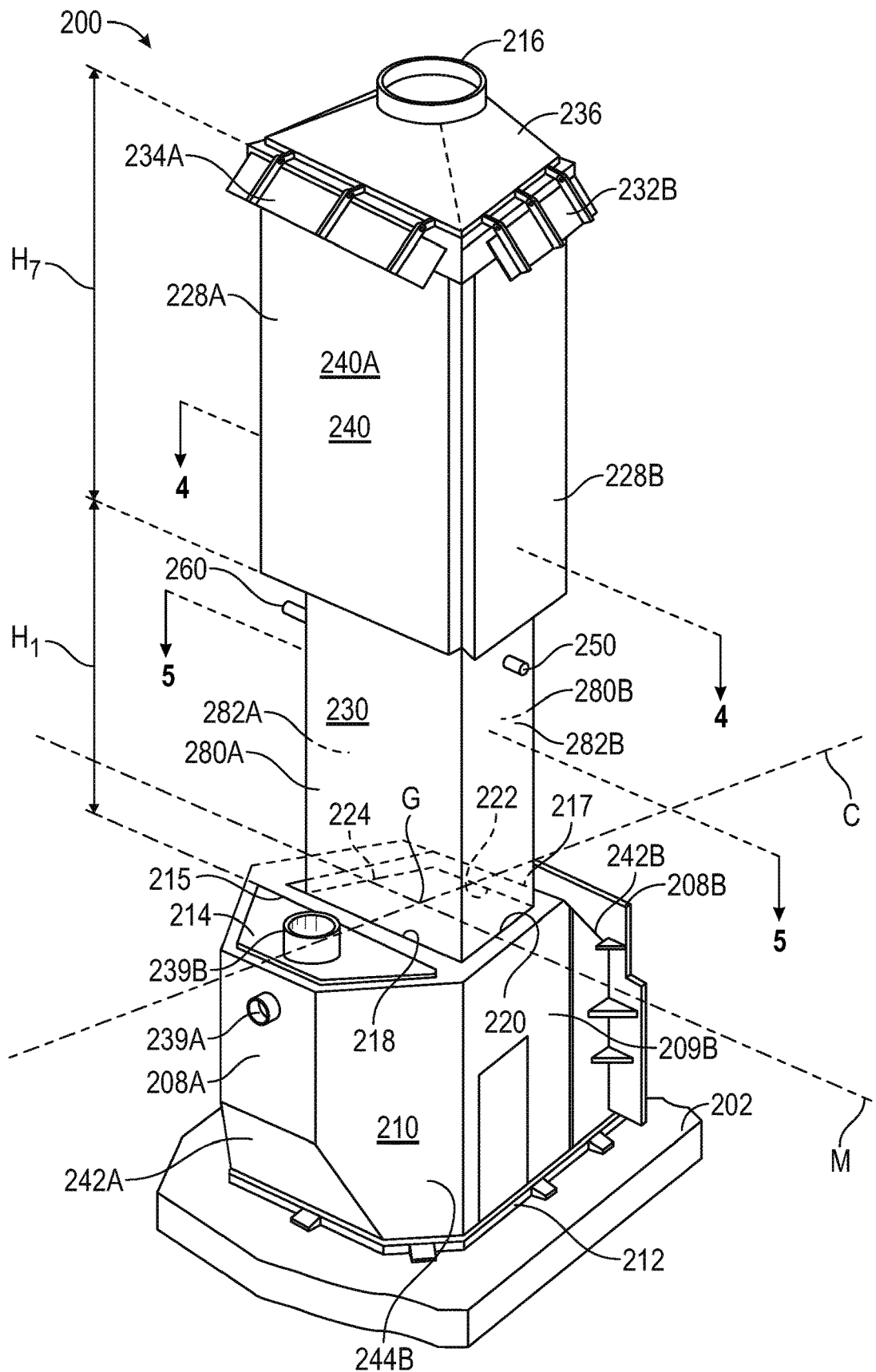
FIG. 2 is a schematic perspective view, partially in phantom, of a second embodiment of a submerged combustion manufacturing system in accordance with the present disclosure.

FIG. 2 is a schematic perspective view, partially in phantom, of a second embodiment 200 of a submerged combustion manufacturing system in accordance with the present disclosure. System 200 is mounted on a plant floor 202 or other support. Embodiment 200 includes an SCM 210 supported on support 202, the SCM having an SCM floor 212, roof or ceiling 214, and a trapezoidal exhaust passage formed in ceiling 214 by sides 218, 220, 222, and 224. Submerged combustion burners are not viewable in this embodiment, but are inserted through the floor 212 as in embodiment 100. Melter 210 includes inlet and outlet end walls 208A and 208B, respectively, sidewalls 209A (not visible in FIG. 2) and 209B, and a roof 214. Melter 210 has a pair of angled sidewalls 244A, 244B (only 244B being visible), as well as downwardly sloping front and back end panels 242A and 242B. Melter 210 actually has a double trapezoidal shape, with the inlet end having the longer side 215 of a first trapezoid mating with the longer side of a second trapezoid having a second end 217, shown by the dashed line in FIG. 2. Melter 210 includes a feed end wall feed inlet 239A, an alternate or additional feed inlet in ceiling 239B, and a molten glass outlet near a bottom of end wall 208B that is not viewable in FIG. 2.

Figure 5:
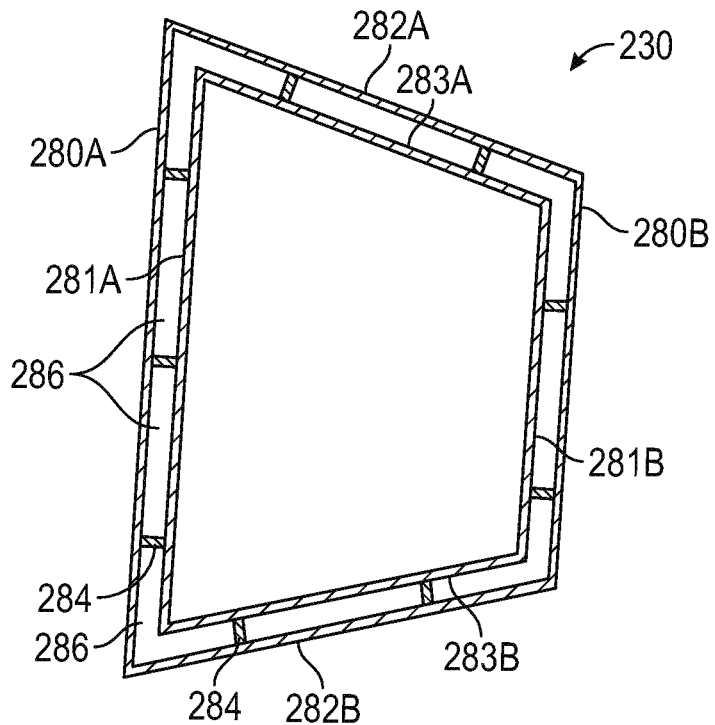
FIG. 5 is a schematic cross-sectional view of one embodiment of a liquid-cooled exhaust section in accordance with the present disclosure.

An exhaust structure in embodiment 200 is defined by a water-cooled exhaust structure 230 and an air-cooled exhaust structure 240. Water-cooled exhaust structure 230 has a double-trapezoid cross-sectional shape similar to the exhaust opening defined by 218, 220, 222, and 224, although this is not necessary, as other rectilinear two-dimensional shapes (for example triangular, square, rectangle, and the like) or curvilinear two-dimensional shapes (circular, elliptical, arcuate, and the like), or combinations thereof (for example, a hemisphere intersecting a rectangle) may be envisioned. Water-cooled exhaust structure 230 includes a water inlet conduit 250 and a water exit conduit 260 (there may be more than one of each), and is a double-walled structure such as illustrated schematically in the cross-section of FIG. 5. Referring to FIG. 5, front and rear external panels 280A and 280B form with external side panels 282A and 282B an outer trapezoid, with an inner trapezoid formed by panels 281A, 281B, 283A, and 283B. The panels may be welded, brazed, or otherwise held together, such as by rivets, bolts, or clamps. Partitions 284 may be similarly attached, and form with the panels a set of water flow channels 286.

Figure 4:
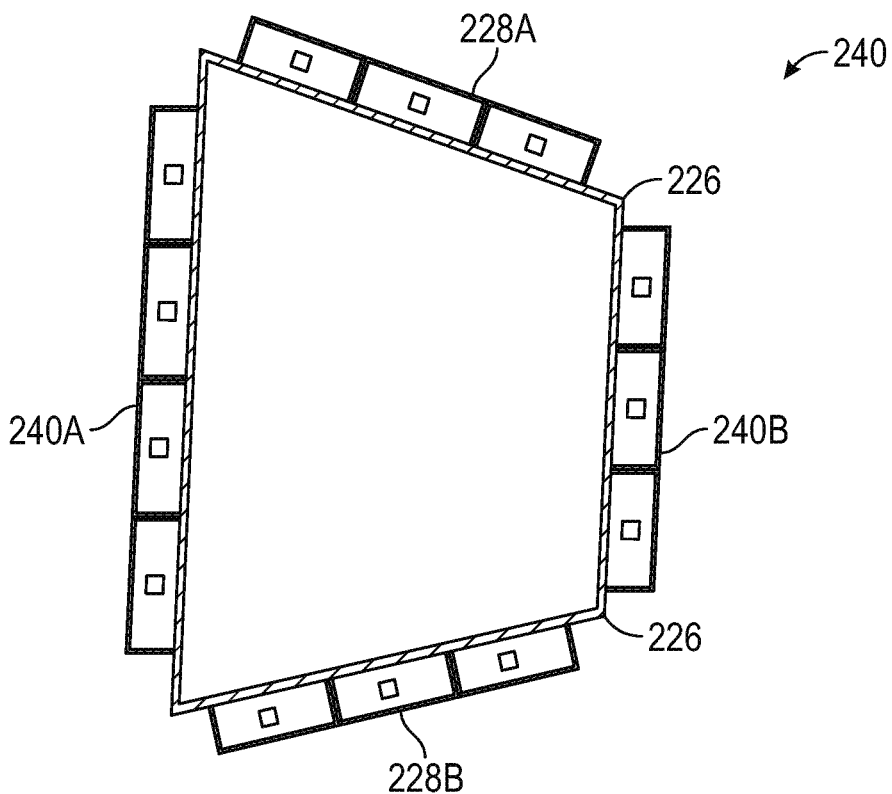

Referring again to FIG. 2, as well as FIG. 4, an air-cooled exhaust structure 240 is defined by a front cooling panel 240A, back wall cooling panel 240B (not illustrated) and sidewall cooling panels 228A and 228B (side wall cooling panel 228A not viewable in FIG. 4). An air inspirator is provided comprising in this embodiment two adjustable side panels 232A (not visible in FIG. 2) and 232B, an adjustable front panel 234A, and an adjustable back panel 234B (not visible in FIG. 2). Adjustable panels 232A, 232B, 234A, and 234B may be adjusted using hinges, hydraulic or pneumatic pistons, motors, or any other mechanism. A metal transition piece or hood 236 is provided, fluidly connecting inspirator panels 232A, 232B, 234A, and 234B to a connector 216 that connects to a conventional metal stack (not illustrated). In an alternative embodiment, not illustrated, inspirator panels 232A, 232B, 234A, and 234B may be replaced by hood 236 that may be movable up and down to adjust air inspiration into hood 236. Hood 236 may be configured to move up and down in a variety of ways, for example by adding guides, rails, wheels, jack screws, one or more motors, and the like to the hood. Such an arrangement is illustrated in Applicant's '740 patent, mentioned in the Background. Hood 236 may be moved up or down using guide wires, for example, using lifting eyes.

Figure 3:
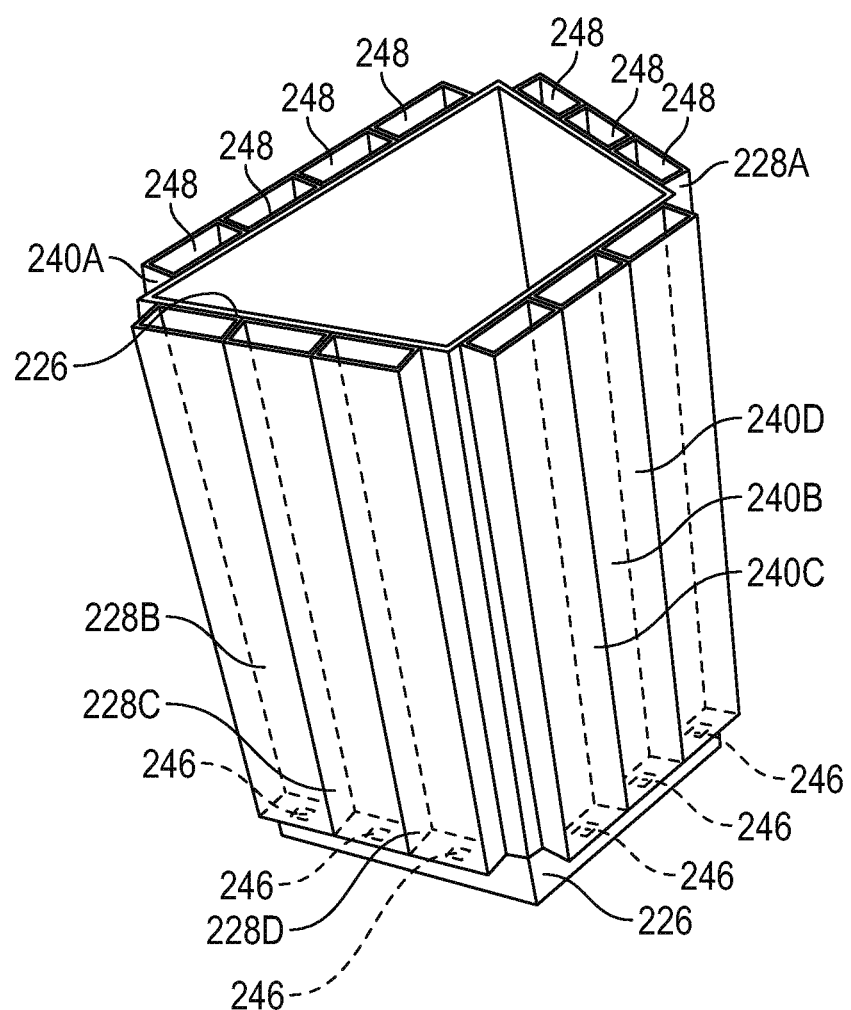
FIGS. 3 and 4 are schematic perspective and cross-sectional views, respectively, of one embodiment of a gas-cooled exhaust section in accordance with the present disclosure.

FIG. 3 is a more detailed schematic perspective view of a portion of the air-cooled exhaust structure of the melter and system embodiment of FIG. 2, illustrating in more detail cooling panels 228B and 240B, each having three vertical flow-though sections separated by partitions 228C, 228D, 240C, and 240D. Cooling panels 228A, 228B, 240A, and 240B have air inlets generally noted at 246 at the bottom of the vertical flow-through sections, and air outlets generally noted at 248 at the top of the vertical flow-through sections. Also viewable in FIG. 3 is a trapezoidal metal panel 226 (constructed of metal such as that known under the trade designation INCONEL® in embodiment 200). Notably, air-cooled exhaust section 240 of embodiment 200 has no (is devoid of) refractory or other lining other than the metal panel 226 constructed of metal such as that known under the trade designation INCONEL®. It was found that a refractory lining would in some instances actually melt when contacted by molten glass or other molten material ejected from the violent, extremely turbulent conditions of an aggressively fired SCM, solidify, and then fall back down into the melter, adversely affecting composition of the molten material and in some instances depositing stones into the SCM melt product that would carryover into glass fiber forming operations, causing shutdown of such operations.

FIG. 6 is a schematic end elevation view, partially in cross-section, of a third embodiment 300 of a submerged combustion manufacturing system in accordance with the present disclosure having two sidewall exhaust discharge ports 315A and 315B positioned at a height H2, and FIG. 7 is a more detailed schematic side elevation view, partially in cross-section, of embodiment 300. Embodiment 300 is supported on a support 302 (plant floor or other) and includes 9 SC burners in a 3×3 pattern, with SC burners 304A, 304B, and 304C being illustrated in FIG. 6, while FIG. 7 illustrates SC burners 304C, 306C, and 310C (burners 304A, 304B, 306A, 306B, 310A, and 310B are not visible in the side elevation of FIG. 7). Embodiment 300 includes feed end wall 308A and product end wall 308B including a product spout 318, and SCM floor 312, ceiling 314, an alternate ceiling feed port 322A, and a feed end wall feed port 322B feeding a splash region having a height H4. The SCM has a headspace having a height H6, and a turbulent molten material region having a height H5. The SCM has an internal height H3, where H3=H4+H5+H6. The SCM includes liquid-cooled exhaust structures 326A (north side) and 326B (south side) each having a height H1 and each comprising a heat and corrosion-resistant metal such as that known under the trade designation INCONEL®, as well as an air-cooled exhaust structure 340 having a front air-cooled panel 340A, also comprising a heat and corrosion-resistant metal such as that known under the trade designation INCONEL®, and, in certain embodiments, devoid of any refractory lining. Adjustable side air inspirators 332A, 332B, as well as adjustable front and back air inspirators 334A and 334B are provided (the latter not viewable in FIG. 7). A metal transition piece or hood 336 fluidly connects air-cooled exhaust structure 340 a conventional metal stack 316 that routes cooled exhaust to environmental compliance units. The SCM of embodiment 300 further includes a refractory lining 346, which may comprise one or more fluid-cooled panels ("fluid-cooled" is a defined term herein). Liquid-cooled exhaust structures 326A (north side) and 326B (south side) include liquid coolant inlets (or outlets) 348A, 348B and liquid coolant outlets (or inlets) 350A, 350B.

Important features of embodiment 300 include the provision of an angle "α" of the initial portions of the liquid-cooled exhaust structures 326A and 326B that fluidly connect these structures with their respective exhaust openings 315A and 315B. This "exhaust angle" α is configured to assist the liquid-cooled exhaust structure in preventing the ejected material portions of melted material from being propelled out of the exhaust structure as solidified material, and maintain any molten materials contacting the first interior surface molten so that it flows back down the first interior surface back into the melter, and may range from about 20 degrees to about 80 degrees (the angle may be the same or different for 315A and 315B). All individual values and subranges of exhaust angle from about 20 degrees up to about 80 degrees are included herein and disclosed herein; for example, the exhaust angle may range from a lower limit of 17, 20, 25.5, 26, 27, 34.8, 44, 53.5, 62.9, 65, or 70 degrees to an upper limit of 85, 81.5, 72.5, 63.5, 54, 45, 40, 35, 32, 30, 27, or 25 degrees. For example, from about 17 to about 77 degrees, or from about 39 to about 73 degrees, or from about 49.5 to about 65 degrees.

Also illustrated schematically in FIGS. 6 and 7 are positions of SC burners 304A, 304B, 304C, 306C, and 310C, with the understanding burners 306A, 306B, 310A, and 310B are not illustrated. The SC burners create turbulent molten material or melt 350 in a turbulent melt region having a height H5 (with curved arrows 356 indicating approximate flow pattern for the turbulent melt), a splash region having a height H4, and ejected portions of molten material 352 in the SCM headspace having a height H6. The ejected portions of molten material 352 (gobs, blobs or splashes) are caused by the nature of SC burners, which cause large balloons 354 of combustion gases to rise in the molten material, which then burst and propel the blobs 352 with sufficient force to break free and in some cases obtain free flight. Blobs 352 may collide with each other or with the refractory inside the SCM, or they may simply fall back into the splash region and fall further into the molten melt. For this and other reasons, another important feature is the height H2 of the exhaust passages 315A and 315B, which must be of sufficient height to be above the height H4 of the splash region. H2 must be greater than the height of the molten material H5 plus height of the splash region H4, preferably 5 percent more, or 6, 7, 8, 9, 10, 11.5, 12, 13.6, 15, 20, or 30 percent more than H5+H4.

Certain embodiments make take advantage of the teachings of Applicant's U.S. Pat. No. 10,233,105, issued Mar. 19, 2019, which describes a relationship between the height of particulate feedstock inlet ports measured from the SCM floor and the height of the SCM ceiling as measured from the SCM floor, and the maximum height of the splash region and the minimum height of the splash region. In certain embodiments the ratio of the height of particulate feedstock inlet ports/the height of the SCM ceiling may be an important parameter, and may range from about 0.33 to about 0.67. All ranges, sub-ranges, and point values from about 0.33 to about 0.67 are explicitly disclosed herein.

FIGS. 9 and 10 are logic diagrams illustrating two methods of the present disclosure. FIG. 9 illustrates a method 900 of melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising one or more exhaust passage through the ceiling (Box 902). Method embodiment 900 further comprises combusting a fuel in the one or more SC burners, the SC burners discharging combustion products under a level of the material being melted in the melter and creating turbulent conditions in substantially all of the material as well as ejected portions of melted material (Box 904). Method embodiment 900 further comprises exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter (Box 906).

FIG. 10 illustrates a method 1000 of melting materials in a submerged combustion melter (SCM) equipped with one or more submerged combustion (SC) burners, the SCM having a length (L) and a width (ON), a centerline (C), a midpoint (M), a sidewall structure having a north side (N) and a south side (S), the sidewall structure connecting a ceiling and a floor of the SCM, the melter comprising one or more exhaust passage through the ceiling (Box 1002). Method embodiment 1000 further comprises combusting a fuel in the one or more SC burners, the SC burners discharging combustion products under a level of the material being melted in the melter and creating turbulent conditions in substantially all of the material as well as ejected portions of melted material (Box 1004). Method embodiment 1000 further comprises exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter (Box 1006).

In operation, flow of feedstock (including particulate feedstock) into the SCM may be continuous, semi-continuous, semi-batch, or batch. For example, in certain embodiments feedstock could flow into a feedstock heat exchange substructure until the feedstock heat exchange substructure is partially full or completely full of feedstock, then the pre-heated feedstock may be dumped into the SCM. One way of accomplishing that may be by use of a grating at the bottom of a feedstock heat exchange substructure having openings slightly smaller than the feedstock particle size. Such an arrangement is disclosed in Applicant's U.S. Pat. No. 9,815,726, incorporated by reference herein.

The initial raw material feedstock may include any material suitable for forming molten inorganic materials. In certain embodiments where the feedstock is pre-heated by melter exhaust, some non-particulate feedstock may have a weight average particle size such that most if not all of the feedstock is not fluidized when traversing through the heat exchange structure or exhaust conduit serving as the heat exchange structure. Such materials may include glass precursors or other non-metallic inorganic materials, such as, for example, limestone, glass cullet, feldspar, basalt or other rock wool or mineral wool forming material, scrap glass (including glass fiber in various forms), scrap rock or mineral wool, and mixtures thereof. Typical examples of basalt that are compositionally stable and available in large quantities are reported in U.S. Patent Publication 20120104306, namely an ore having a larger amount of $SiO_2$ (A, for high-temperature applications) and an ore having a smaller amount of $SiO_2$ (B, for intermediate-temperature applications), both of which have approximately the same amount of $Al_2O_3$. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SiO_2$: and (3) a mixture of the high-temperature basalt rock ore (A) and the intermediate-temperature basalt rock ore (B).

Basalt rock (basalt ore) is an igneous rock. According to U.S. Patent Publication 20120104306, major examples of the constituent mineral include: (1) plagioclase: $Na(AlSi_3O_8)$—$Ca(Al_2SiO_8)$; (2) pyroxene: $(Ca, Mg, Fe^{2+}, Fe^{3+}, Al, Ti)_2[(Si, Al)_2O_6]$; and (3) olivine: $(Fe, Mg)_2SiO_4$. Ukrainian products are inexpensive and good-quality.

Tables 3 and 4 (from U.S. Patent Publication 20120104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 3

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 04~0.6 |
| Mn | 0.1~0.2 | 0.1~0.2 | 0.1~0.2 |
| P | 0.05~0.10 | 0.05~0.09 | 0.07~0.10 |
| B | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S | 0.01~0.03 | 0.01~0.03 | 0.01~0.03 |

TABLE 4

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.4 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

In embodiments wherein glass batch is used as sole or as a supplemental feedstock, one glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass batch compositions may be used, such as those described in Applicant's published U.S. application 2008/0276652.

As noted herein, submerged combustion burners and burner panels may produce violent or aggressive turbulence of the molten inorganic material in the SCM and may result in sloshing or splashing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in Applicant's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of a feedstock feeder may be adjusted through a signal, and one or more of fuel and/or oxidant conduits may be adjusted via a signal, it being understood that suitable transmitters and actuators, such as valves and the like, are not illustrated for clarity.

Melter apparatus in accordance with the present disclosure may also comprise one or more wall-mounted submerged combustion burners, and/or one or more roof-mounted non-submerged burners (not illustrated). Roof-mounted burners may be useful to pre-heat the melting zone of the SCM, and serve as ignition sources for one or more submerged combustion burners and/or burner panels. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, one or more roof-mounted burners could be used supplementary with a baffle (for example, when the baffle requires service) to form a temporary curtain to prevent particulate carryover. In certain embodiments, all submerged combustion burners and burner panels may be oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical (Joule) heating in certain embodiments, in certain melter zones.

Certain SCM embodiments may comprise burner panels as described in Applicant's U.S. patent application Ser. No. 14/838,148, filed Aug. 27, 2015, comprising a burner panel body and one or more sets of concentric conduits for flow of oxidant and fuel. Certain burner panels disclosed therein include those wherein the outer conduit of at least some of the sets of concentric conduits are oxidant conduits, and the at least one inner conduit is one or more fuel conduits. Certain burner panel embodiments may comprise non-fluid cooled or fluid-cooled protective members comprising one or more noble metals. Certain burner panel embodiments may comprise non-fluid cooled or fluid-cooled protective members consisting essentially of one or more noble metals. Certain burner panel embodiments may comprise non-fluid cooled or fluid-cooled protective members consisting of one or more noble metals. Certain burner panel embodiments may comprise those wherein the lower fluid-cooled portion and the upper non-fluid cooled portion are positioned in layers, with the lower fluid-cooled portion supporting the sets of conduits and the associated protective members. Certain burner panel embodiments may comprise those wherein the non-fluid cooled protective member is a shaped annular disk having a through passage, the through passage of the shaped annular disk having an internal diameter substantially equal to but not larger than an internal diameter of the outer conduit. Certain burner panel embodiments may comprise those wherein an internal surface of the through passage of the shaped annular disk and a portion of a top surface of the shaped annular disk are not submerged by the fluid-cooled or non-fluid-cooled portions of the panel body. Certain combustion burner panels may comprise a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body. Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter. Certain burner panel embodiments may comprise a mounting sleeve. In certain burner panel embodiments the mounting sleeve having a diameter at least sufficient to accommodate the external diameter of the fluid-cooled collar. In certain embodiments, the burner panel may include only one or more fuel conduits, or only one or more oxidant conduits. These embodiments may be paired with other panels supplying fuel or oxidant (as the case might be), the pair resulting in combustion of the fuel from one panel with the oxidant from the other panel. In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

There are innumerable options, variations within options, and sub-variations of options for the SCM operator to select from when operating an SCM and profiling the SC burners. After all, the SCM is essentially a continuous or semi-batch chemical reactor with simultaneous heat and mass transfer. For example, to name just a few, an operator may choose (option 1) to operate all SC burners equally, that is, using the same fuel and oxidant, and of the total combustion flow rate (TCFR) from the SC burners, each SC burner is operated to produce the same fraction of the TCFR. Another option (option 2) would be to operate as option 1, but with different oxidant in one or more burners. Option 3 may be to operate with same oxidant in all burners, but with different fuel in one or more SC burners. As one can readily see, the number of options is quite large, and selecting the operation of the SC burners in such a chemical reactor with simultaneous heat and mass transfer can be an overwhelming task. Even if the "same" fuel and "same" oxidant are used for each SC burner (an ideal assumption that is never true in practice, since fuel and oxidant compositions change with time), the variations are endless, and can be an overwhelming task to sort through. The task of operating an SCM is even more daunting when particulate feed materials are fed to the SCM from above the turbulent, violent melt. In certain embodiments herein, SC burners that are directly underneath an exhaust opening in an SCM having ceiling exhaust openings may be reduced in firing rate, or completely shut off, in order to minimize ejection of molten material form the melt. Such operation should also reduce the tendency to eject solidified pellets out of the melter stack when aggressively firing the SC burners. The reduction in firing rate of SC burners directly under the exhaust openings may be 5 percent, or 6, 7, 8, 8.5, 9, 9.3, 10, 11, 15, 25, 35, 55, or 75 percent, or 100 percent if shut off. For example, in embodiment 200 (FIG. 2), firing rate of SC burners 6A and 6B may be reduced or shut off. This reduction of firing rate of SC burners may also be practiced for SC burners in close proximity of exhaust passages in the sidewalls. For example, in embodiment 300, it may be desirable to reduce firing rate of SC burners 306A and 306C in relation to the other SC burners.

Suitable materials for glass-contact refractory, which may be present in SCMs, burners, and burner panels useful herein, include AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material may be dictated by the geometry of the apparatus, the type of material being produced, operating temperature, burner body panel geometry, and type of glass or other product being produced.

The term "fluid-cooled" means use of any coolant fluid (heat transfer fluid) to transfer heat away from the equipment in question, other than ambient air that resides naturally on the outside of the equipment. For example, portions of or the entire panels of sidewall structure, floor, and ceiling of the SCM, liquid-cooled and gas-cooled exhaust structures, portions or all of heat transfer substructures used to preheat feedstock (for example nearest the melter), portions of feedstock supply conduits, and portions of SC burners, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Heat transfer liquids and slurries may comprise small amounts of various gases such as oxygen and nitrogen present in air bubbles. Heat transfer gases may comprise small amounts of various liquids such as condensed water droplets. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in Applicant's U.S. Pat. No. 8,769,992.

Certain systems and processes of the present disclosure may utilize measurement and control schemes such as described in Applicant's U.S. Pat. No. 9,096,453, and/or feed batch densification systems and methods as described in Applicant's U.S. Pat. No. 9,643,869. Certain SCMs and processes of the present disclosure may utilize devices for delivery of treating compositions such as disclosed in Applicant's U.S. Pat. No. 8,973,405.

Certain SCM and method embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at melter exhaust exit, pressure of the primary oxidant entering burners or burner panels, humidity of the oxidant, burner or burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes. Flow diverter positions may be adjusted or controlled to increase heat transfer in heat transfer substructures and exhaust conduits.

Various conduits, such as feedstock supply conduits, exhaust conduits, heat-transfer fluid supply and return conduits, oxidant and fuel conduits of burners or burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization operating under the name NACE International, Houston, Tex.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in Applicant's U.S. Pat. No. 10,131,563.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

The total quantities of fuel and oxidant used by SC burners or SC burner panels may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the melter (and/or Joule heating) will depend upon the efficiency of any preheating of the feedstock in a feedstock heat exchange substructure, if present. The larger the amount of heat transferred to the feedstock, the lower the heat energy required in the melter from the fuel and/or Joule elements. When operating "lean", the combustion ratio is above about 1.0, or above about 1.5, or above about 2.0, or above about 2.5. When operating "rich", the combustion ratio is below about 1.0, or below about 0.9, or below about 0.8, or below about 0.7, or below about 0.6, or below about 0.5, or below about 0.2.

In SCMs, the velocity of the fuel in the various SC burners and/or SC burner panels depends largely on the burner/burner panel geometry used, but generally is at least about 15 meters/second (m/s). The upper limit of fuel velocity depends primarily on the desired penetration of flame and/or combustion products into the melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust conduit, such as in the heat exchange substructure, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft./sec at 400 scfh flow rate.

Certain system and method embodiments may be combined with systems and methods from Applicant's U.S. Pat. No. 9,982,884; for example, operating the arrangement of SC burners such that a progressively higher percentage of a total combustion flow from the SC burners occurs from SC burners at progressively downstream positions; or melting using an arrangement of two or more SC burners comprises melting with a matrix of at least two rows and at least two columns of SC burners wherein a row spans a majority of the width (W) and a column spans a majority of the length (L) of the SCM, and wherein the operating is selected from the group consisting of:
  (a) each SC burner in a first row R1 operates at a rate $r_1$, each SC burner in a second row R2 operates at a rate $r_2$, wherein $r_2 > r_1$, and
  (b) if the matrix is a two row by three column matrix or larger, SC burners on the N and S sides in the first row R1 operate at a rate $r_3$, the SC burner in the center (C) of the first row R1 operates at a rate $r_4$, where $r_3 > r_4$, and SC burners on N and S sides in a second row R2 operate at a rate $r_5$ and the SC burner in the center (C) operates at a rate $r_6$, where $r_5 > r_6 \geq r_4$, and $r_5 > r_3$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
  (c) each SC burner in a first row R1 operates at a rate $r_1$, each SC burner in a second row R2 operates at a rate $r_2$, wherein $r_2 > r_1$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
  (d) if the matrix is a two row by three column matrix or larger, SC burners on the N and S sides in the first row R1 operate at a rate $r_3$, and SC burners in the center (C) of the first row operate at a rate $r_4$, where $r_3 > r_4$, and SC burners on N and S sides in a second row R2 operate at a rate $r_5$ and SC burners in the center (C) operate at a rate re, where $r_5 > r_6 \geq r_4$, and $r_5 > r_3$.

Certain method embodiments may further comprise measuring concentration of a tracer compound or element in melt exiting the SCM to verify an increase in residence time of melt in the SCM compared to residence time of the melt when all SC burners are firing equally. In certain methods, the tracer compound or element may be selected from the group consisting of ZnO (zinc oxide), $SrCO_3$ (strontium carbonate), $BaCO_3$ (barium carbonate), and $Li_2CO_3$ (lithium carbonate), and mixtures and combinations thereof.

Certain method embodiments may include maximizing mixing and melting in an SCM, the method comprising (or consisting essentially of, or consisting of):
  (a) melting an inorganic feedstock in an SCM using an arrangement of two or more SC burners, the SCM having a length (L) and a width (ON), a centerline (C), a north side (N) and a south side (S); and
  (b) operating the arrangement of SC burners such that a progressively lower percentage of total combustion flow rate from the SC burners occurs from SC burners at progressively downstream positions from the feed end of the SCM up to a midpoint (M) of the SCM length (L), and such that a progressively higher percentage of total combustion flow rate from the SC burners occurs from SC burners at progressively downstream positions from the midpoint (M) to the melt exit end of the SCM.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating the arrangement of SC burners comprises operating the SC burners such that SC burners nearer the feed end of the SCM have a flow rate $r_7$, SC burners near the melt exit end have a flow rate $r_8$, and SC burners near an intersection of L and M have a flow rate $r_9$, wherein:
  $r_7 > r_9$
  $r_8 > r_9$, and
  $r_8 \geq r_7$.

Certain method embodiments may include wherein the matrix is a 3 row×3 column matrix, and SC burners on the N and S sides have flow rate greater than the center SC burners.

Certain method embodiments may include maximizing mixing and temperature increase in an SCM, the method comprising (or consisting essentially of, or consisting of):
  (a) melting an inorganic feedstock in an SCM using an arrangement of two or more SC burners, the SCM having a length (L) and a width (W), a centerline (C), a north side (N) and a south side (S); and
  (b) operating the arrangement of SC burners such that SC burners in a first zone of the SCM operate fuel lean, and SC burners in a second zone of the SCM operate fuel rich, and where combustion products of the SC burners in the first zone mix with combustion products of the SC burners of the second zone at a position in the SCM higher than where the lean or rich combustion takes place.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM.

Certain method embodiments may include wherein the matrix is a 3 row by 3 column matrix and the first zone is at a midpoint (M) of the SCM length (L), and the second zone is downstream of the midpoint (M) of the SCM length (L).

Certain method embodiments may include wherein the matrix is a 3 row by 3 column matrix and the first zone is at a midpoint (M) of the SCM length (L), and the second zone is upstream of the midpoint (M) of the SCM length (L).

Certain method embodiments may include wherein the first (lean) zone is near the feed inlet, and the second (fuel rich) zone is immediately downstream the first zone, and including feeding small (less than 1 mm APS) particle size batch material to the SCM in the feed inlet.

Certain method embodiments may include maximizing mixing without substantially increasing temperature in an SCM, the method comprising (or consisting essentially of, or consisting of):
  (a) melting an inorganic feedstock in an SCM using an arrangement of two or more SC burners, the SCM having a length (L) and a width (ON), a centerline (C), a north side (N) and a south side (S); and
  (b) operating the arrangement of SC burners such that SC burners in a first zone of the SCM operate fuel lean, and SC burners in all other zones of the SCM operate neither fuel rich nor fuel lean.

Certain method embodiments may include wherein the lean zone is between the feed end of the SCM and the midpoint (M). Certain method embodiments may include wherein the lean zone is nearer the melter feed end than any other melting zone. Certain method embodiments may include wherein the lean zone is between the midpoint (M) and the melter exit end. Certain method embodiments may include wherein one or more SC burners is operated in pulsing mode. Certain method embodiments may include feeding large particle size feedstock (at least 10 cm APS) to the SCM inlet end.

Embodiments disclosed herein include:

A: A submerged combustion manufacturing system comprising:
  a submerged combustion melter (SCM) equipped with one or more submerged combustion (SC) burners, the SCM having a length (L) and a width (ON), a centerline (C), a midpoint (M), a sidewall structure having a north side (N) and a south side (S), the sidewall structure connecting a ceiling and a floor of the SCM, and one or more exhaust passages through the ceiling, the exhaust passages having an aggregate hydraulic diameter;
  the one or more submerged combustion burners configured to discharge combustion products under a level of material being melted in the melter and create turbulent conditions in substantially all of the material being melted as well as ejected portions of melted material; and
  an exhaust structure fluidly connecting the exhaust passage with an exhaust stack, the exhaust structure comprising (or consisting essentially of, or consisting of):

a liquid-cooled exhaust structure fluidly connected to the exhaust passage, the liquid-cooled exhaust structure defining a liquid-cooled exhaust chamber having a first interior surface, the fluid-cooled exhaust chamber having a cross-sectional area greater than that of the exhaust stack but less than the melter, the exhaust passage and liquid-cooled exhaust structure configured to maintain temperature and pressure of the exhaust, and exhaust velocity through the exhaust passage and the exhaust structure, at values sufficient to prevent the ejected material portions of melted material from being propelled out of the exhaust structure as solidified material, and maintain any molten materials contacting the first interior surface molten so that it flows back down the first interior surface back into the melter.

B: A submerged combustion manufacturing system comprising:

a submerged combustion melter (SCM) equipped with one or more submerged combustion (SC) burners, the SCM having a length (L) and a width (ON), a centerline (C), a midpoint (M), a sidewall structure having a north side (N) and a south side (S), the sidewall structure connecting a ceiling and a floor of the SCM, and one or more exhaust passages through the sidewall structure, the exhaust passages having an aggregate hydraulic diameter;

the one or more submerged combustion burners configured to discharge combustion products under a level of material being melted in the melter and create turbulent conditions in substantially all of the material being melted as well as ejected portions of melted material; and an exhaust structure fluidly connecting the exhaust passage with an exhaust stack, the exhaust structure comprising (or consisting essentially of, or consisting of):

a liquid-cooled exhaust structure fluidly connected to the exhaust passage, the liquid-cooled exhaust structure defining a liquid-cooled exhaust chamber having a first interior surface, the fluid-cooled exhaust chamber having a cross-sectional area greater than that of the exhaust stack but less than the melter, the exhaust passage and liquid-cooled exhaust structure configured to maintain temperature and pressure of the exhaust, and exhaust velocity through the exhaust passage and the exhaust structure, at values sufficient to prevent the ejected material portions of melted material from being propelled out of the exhaust structure as solidified material, and maintain any molten materials contacting the first interior surface molten so that it flows back down the first interior surface back into the melter.

C: A submerged combustion manufacturing method comprising:

melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising an exhaust passage through the ceiling;

combusting a fuel in the one or more SC burners, the SC burners discharging combustion products under a level of the material being melted in the melter and creating turbulent conditions in substantially all of the material as well as ejected portions of melted material; and exhausting exhaust material from the melter through an exhaust structure fluidly connecting the exhaust passage with an exhaust stack, the exhaust structure comprising (or consisting essentially of, or consisting of) a liquid-cooled exhaust structure, the liquid-cooled exhaust structure defining a liquid-cooled exhaust chamber having a first interior surface, the liquid-cooled exhaust structure configured to prevent the ejected material portions of melted material from being propelled out of the exhaust structure as solidified material, and maintain any molten materials contacting the first interior surface molten so that it flows back down the first interior surface back into the melter.

D: A submerged combustion manufacturing method comprising:

melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the melter comprising and one or more exhaust passages through the wall structure;

combusting a fuel in the one or more SC burners, the SC burners discharging combustion products under a level of the material being melted in the melter and creating turbulent conditions in substantially all of the material as well as ejected portions of melted material; and exhausting exhaust material from the melter through an exhaust structure fluidly connecting the one or more exhaust passages with an exhaust stack, the exhaust structure comprising (or consisting essentially of, or consisting of) one or more liquid-cooled exhaust structures, the one or more liquid-cooled exhaust structures defining one or more liquid-cooled exhaust chambers having a first interior surface, the liquid-cooled exhaust structures configured to prevent the ejected material portions of melted material from being propelled out of the exhaust structure as solidified material, and maintain any molten materials contacting the first interior surface molten so that it flows back down the first interior surface back into the melter.

Each of the embodiments A, B, C, and D may have one or more of the following additional elements in any combination: Element 1: the system and method may further comprise a gas-cooled exhaust structure fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining. Element 2: systems and methods wherein the gas-cooled exhaust chamber has a cross-sectional area substantially equal to the cross-sectional area of the liquid-cooled exhaust chamber. Element 3: systems and methods comprising a feed inlet in a feed end of the wall structure, a molten product outlet in an exit end of the wall structure, wherein the exhaust passage through the ceiling is positioned substantially centrally between the feed and exit ends. Element 4: systems and methods wherein the exhaust passage and the liquid-cooled exhaust chamber have a cross-sectional area configured to produce exhaust velocity of 25 ft./min. or less through the exhaust passage and liquid-cooled exhaust chamber. Element 5: systems and methods wherein the submerged combustion burners are configured to discharge combustion products primarily non-laterally under the level of material being melted in the melter. Element 6: systems and methods wherein the submerged combustion burners are configured to discharge combustion products primarily vertically under the level of material being melted in the melter. Element 7: systems and methods wherein the wall structure comprises a feed end wall, an exit end wall, and two side walls, with each side wall connected to both the feed end wall and the exit end wall. Element 8: systems and methods wherein the liquid-cooled exhaust structure is constructed of metal having service temperature higher than temperature of the exhaust materials. Element 9: systems and methods wherein the gas-cooled exhaust structure is constructed of metal having service temperature higher than temperature of the exhaust materials. Element 10: systems and methods wherein the metal layer is one or more austenitic nickel-chromium super alloys, and the air-cooled surfaces are steel. Element 11: systems and methods wherein the liquid-cooled exhaust structure is configured for cooling using a liquid selected from the group consisting of water, organic liquids, inorganic liquids, and combinations thereof. Element 12: systems and methods comprising an air inspirator fluidly connecting the liquid-cooled exhaust barrier and the exhaust stack. Element 13: systems and methods wherein the air inspirator is selected from the group consisting of one or more adjustable panels, and one or more adjustable hoods. Element 14: systems and methods wherein the exhaust structure has a cross-sectional shape selected from the group consisting of rectangular, round, oval, trapezoidal, triangular, U-shaped, quadrangular, hexagonal, octagonal, and parabolic. Element 15: systems and methods wherein the exhaust passage is substantially centrally located between a feed end and an exit end of the melter, and the exhausting of the exhaust material through the exhaust structure comprises exhausting the exhaust material substantially centrally between the feed end and the exit end of the melter. Element 16: systems and methods comprising inspiring air into the exhaust material through an air inspirator fluidly connecting the liquid-cooled exhaust structure and the exhaust stack. Element 17: systems and methods comprising adjusting the air inspirator to allow more or less air to enter the exhaust stack. Element 18: systems and methods comprising feeding small (less than 1 mm APS) particle size batch material to the SCM into at least one feed inlet port. Element 19: systems and methods comprising feeding large particle size feedstock (at least 10 cm APS) into the SCM through one or more auxiliary inlet ports.

Although only a few exemplary embodiments of this disclosure have been described in detail above, those skilled in the art will readily appreciate that many modifications are possible in the exemplary embodiments without materially departing from the novel teachings and advantages of this disclosure, and these modification are considered further Elements in accordance with the previous paragraph that may be combined with all other embodiments. For example, the heat transfer structures and methods described herein may be counter-current, cross-current, or co-current, or combination thereof in any particular embodiment (for example, a first liquid-cooled section where liquid heat transfer fluid flows generally counter-current to melter exhaust, followed by a second liquid-cooled section where a second (or the same) liquid heat transfer fluid flows generally co-current to melter exhaust; or for example, a liquid-cooled section that is counter-current, followed by a gas-cooled section that is co-current). One, two, or more than two different liquid heat transfer fluids may be used in a liquid-cooled section (for example water in a first section, and an ethylene glycol mixture in a second section). One, two, or more than two different gas heat transfer fluids may be used in a gas-cooled section (for example water in a first section, and an ethylene glycol/water mixture in a second section). Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A submerged combustion manufacturing method comprising:
    melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the SCM comprising one or more exhaust passages through the ceiling;
    combusting a fuel in the one or more SC burners, the one or more SC burners discharging combustion products under a level of the materials being melted in the SCM and creating turbulent conditions in substantially all of the materials being melted as well as ejected portions of melted material; and
    exhausting exhaust materials from the SCM through an exhaust structure fluidly connecting the one or more exhaust passages with an exhaust stack, the exhaust structure comprising:
        a liquid-cooled exhaust structure of height H1 fluidly connected to the one or more exhaust passages, the liquid-cooled exhaust structure defining a liquid-cooled exhaust chamber having a first interior surface, the liquid-cooled exhaust chamber having a cross-sectional area greater than that of the exhaust stack but less than the SCM,
        the one or more exhaust passages and liquid-cooled exhaust structure maintaining temperature and pressure of the exhaust materials from the SCM, and exhaust velocity of the exhaust materials from the SCM through the exhaust structure, at values sufficient to prevent the ejected portions of melted material from being propelled out of the exhaust structure and into the exhaust stack as solidified material, and maintain any molten materials contacting the first interior surface molten so that it flows back down the first interior surface back into the SCM, and
        a gas-cooled exhaust structure of height H7 fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining,
    wherein H1 is greater than or equal to H7, and H7 is not 0.

2. The method of claim 1 wherein the melting, combusting, and exhausting are performed, and the one or more exhaust passages and the liquid-cooled exhaust chamber are configured to produce exhaust velocity of 25 ft./min. or less through the one or more exhaust passages and liquid-cooled exhaust chamber.

3. The method of claim 1 wherein the one or more exhaust passages are substantially centrally located between a feed end and an exit end of the SCM, and the exhausting of the exhaust materials through the liquid-cooled exhaust structure comprises exhausting the exhaust materials substantially centrally between the feed end and the exit end of the SCM.

4. The method in accordance with claim 1 comprising feeding small (less than 1 mm APS) particle size batch material to the SCM into at least one feed inlet port.

5. The method in accordance with claim 1 comprising feeding large particle size feedstock (at least 10 cm APS) into the SCM through one or more auxiliary inlet ports.

6. The method of claim 1 comprising inspiring air into the exhaust materials through an air inspirator fluidly connecting the liquid-cooled exhaust structure and the exhaust stack.

7. The method of claim 6 comprising adjusting the air inspirator to allow more or less air to enter the exhaust stack.

8. A submerged combustion manufacturing method comprising:
   melting materials in a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the SCM comprising one or more exhaust passages through the sidewall structure;
   combusting a fuel in the one or more SC burners, the one or more SC burners discharging combustion products under a level of the materials being melted in the SCM and creating turbulent conditions in substantially all of the materials being melted as well as ejected portions of melted material; and
   exhausting exhaust materials from the SCM through an exhaust structure fluidly connecting the one or more exhaust passages with an exhaust stack, the exhaust structure comprising:
      a liquid-cooled exhaust structure of height H1 fluidly connected to the one or more exhaust passages, the liquid-cooled exhaust structure defining a liquid-cooled exhaust chamber having a first interior surface, the liquid-cooled exhaust chamber having a cross-sectional area greater than that of the exhaust stack but less than the SCM, the one or more exhaust passages and liquid-cooled exhaust structure maintaining temperature and pressure of the exhaust materials from the SCM, and exhaust velocity of the exhaust materials from the SCM through the exhaust structure, at values sufficient to prevent the ejected portions of melted material from being propelled out of the exhaust structure and into the exhaust stack as solidified material, and maintain any molten materials contacting the first interior surface molten so that it flows back down the first interior surface back into the SCM, and
      a gas-cooled exhaust structure of height H7 fluidly connecting the liquid-cooled exhaust structure and the exhaust stack, the gas-cooled exhaust structure defining a gas-cooled exhaust chamber having a second interior surface, the gas-cooled exhaust structure consisting of a metal layer forming the second interior surface, the metal layer having one or more gas-cooled external surfaces, the gas-cooled exhaust structure devoid of refractory or other lining,
   wherein H1 is greater than or equal to H7, and H7 is not 0.

9. The method of claim 8 wherein the melting, combusting, and exhausting are performed, and the one or more exhaust passages and the liquid-cooled exhaust chamber are configured to produce exhaust velocity of 25 ft./min. or less through the one or more exhaust passages and liquid-cooled exhaust chamber.

10. The method of claim 8 wherein the one or more exhaust passages are substantially centrally located between a feed end and an exit end of the SCM, and the exhausting of the exhaust materials through the liquid-cooled exhaust structure comprises exhausting the exhaust materials substantially centrally between the feed end and the exit end of the SCM.

11. The method in accordance with claim 8 comprising feeding small (less than 1 mm APS) particle size batch material to the SCM into at least one feed inlet port.

12. The method in accordance with claim 8 comprising feeding large particle size feedstock (at least 10 cm APS) into the SCM through one or more auxiliary inlet ports.

13. The method of claim 8 comprising inspiring air into the exhaust materials through an air inspirator fluidly connecting the liquid-cooled exhaust structure and the exhaust stack.

14. The method of claim 13 comprising adjusting the air inspirator to allow more or less air to enter the exhaust stack.

* * * * *